Feb. 12, 1957 M. CANEPA 2,781,504

BINARY SYSTEM

Filed Dec. 17, 1954 3 Sheets-Sheet 1

INVENTOR.
MICHELE CANEPA

BY

Ostrolenk & Faber
ATTORNEYS

Feb. 12, 1957 M. CANEPA 2,781,504

BINARY SYSTEM

Filed Dec. 17, 1954 3 Sheets-Sheet 2

INVENTOR.
MICHELE CANEPA

BY

Ostrolenk & Faber

ATTORNEYS

FIG. 6
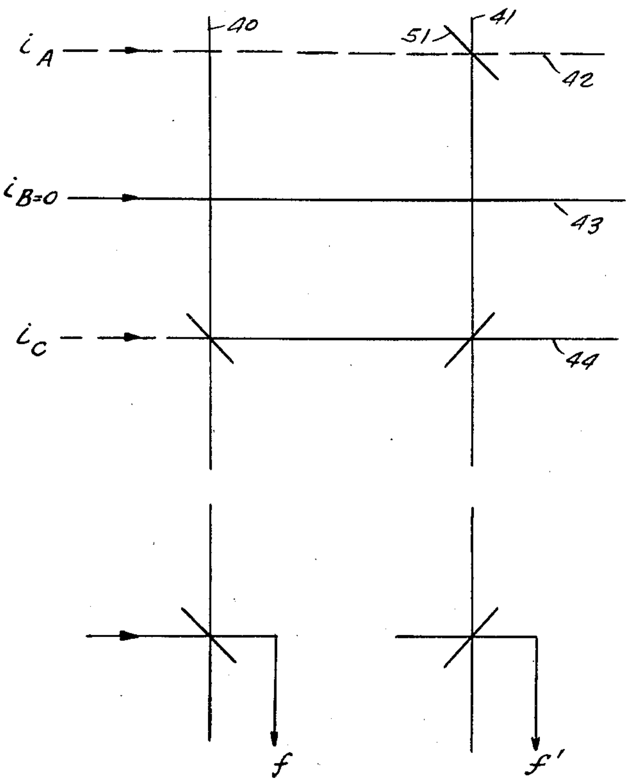
FIG. 7a FIG. 7b
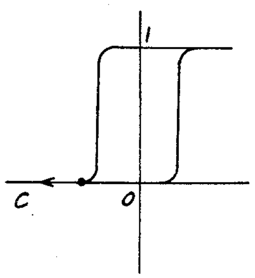
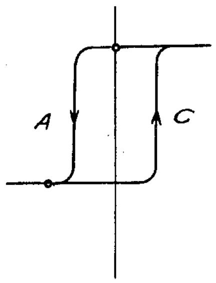
INVENTOR.
MICHELE CANEPA
BY
Ostrolenk & Faber
ATTORNEYS United States Patent Office 2,781,504

Patented Feb. 12, 1957

2,781,504

BINARY SYSTEM

Michele Canepa, South Norwalk, Conn., assignor to Olivetti Corporation of America, New York, N. Y., a corporation of Massachusetts Application December 17, 1954, Serial No. 476,023

6 Claims. (Cl. 340—174)

The present invention relates to triggering devices and more particularly to triggering devices utilizing the hysteresis characteristic of ferro-magnetic or ferro-electric materials.

It is well known in the art that materials having a substantially rectangular hysteresis loop can be used with great advantage for switching or triggering. Presently known two-state magnetic storage devices comprise essentially a pair of magnetic cores having a rectangular hysteresis loop, a pair of input windings, a pair of output windings, and a pair of shift or advance windings. Thus, each core of such a magnetic storage device comprises a set of three windings: an input winding, an output winding and a shift winding.

The magnetic cores used in these storage devices are such that a certain minimum critical amount of magnetomotive force must be applied to a magnetic core to drive it from saturation in one polarity to saturation in the opposite polarity. When less than this magnetomotive force is applied, it may still change the saturation slightly, but will not cause the core to saturate in the opposite polarity.

Two-state dielectric storage devices comprise a pair of crystal capacitors where the crystal may, for example, be barium titanate. As presently constructed, each crystal capacitor has an input and advance lead brought in parallel through appropriate circuitry to one of its plates. The other plate is connected to an output capacitor across which will appear the output pulse.

Devices such as the one described above are often used for triggering the inputs of a binary adder, for example, one using rectifiers. Binary adders require not only input signals such as *a*, *b*, and *c*, but also their binary complements *a*,', *b*' and *c*'.

Conventional trigger pairs using electronic tubes have been known for a considerable length of time and have used modifications of the Eccles-Jordan circuit also known as the bistable multivibrator. These vacuum tube trigger pairs were capable of providing at their outputs signals such as *a*, *b*, and *c*, and also their components *a*', *b*' and *c*'.

Trigger pairs using ferro-magnetic or ferro-electric cores of the type known up to the present time could not produce an output signal *a*, an output signal *a*' without the insertion of a vacuum tube in the circuit. Thus, while trigger pairs using a ferro-magnetic or ferro-electric core were capable of giving the desired output signals, they could do so only because of the insertion in the circuit of a vacuum tube, for example, a triode.

The introduction of a triode, however, created disadvantages such as the use of a relatively large number of vacuum tubes, thus causing a relatively large power consumption, poor reliability and a life determined by the life of the vacuum tubes.

The triggering system of the present invention uses a smaller number of vacuum tubes than in prior types, thus improving the reliability, decreasing power consumption, lengthening the useful life of the system in which they are used and furthermore making the system easier to manufacture and, therefore, less costly.

Accordingly, one object of the present invention is the provision of means for reducing the number of vacuum tubes in trigger systems using ferro-magnetic or ferro-electric elements.

Another and more specific object of the present invention is the provision of means for reducing the number of tubes used in a trigger pair or flip-flop of ferro-magnetic or ferro-electric elements by one.

Still another object of the present invention is the provision of means of improving the reliability of trigger systems using ferro-magnetic or ferro-electric elements and vacuum tubes and, therefore, also improving the reliability of circuits in which such trigger systems are used, for example, binary adders.

A further object of the present invention is an adding device having a lower power consumption than prior types.

Still a further object of the present invention is a binary adder having longer useful life than prior types.

In the present invention two ferro-magnetic or ferro-electric elements are used for each trigger pair. In the case of ferro-magnetic elements, each core is provided with three windings which may be called the set winding, the advance winding, and the output winding, respectively.

The set winding, which corresponds to the input winding of one core, is connected in series to the set winding of the second core. Similarly, the advance winding of the first core is connected in series to the advance winding of the second core. The output windings are connected together at one end and at the other ends positively provide, respectively, indications of the presence of a signal or of its binary complement.

In the trigger pair of the present invention, the second core, for example, is provided with a fourth winding which will be called the reset winding. As an input pulse is applied to the trigger pair of the present invention, the two cores will be driven to saturation. Considering the first core first, if now an advance pulse is applied through its advance winding, the first core is returned to its original saturation, and the signal which we may call *f* appears at its output winding.

For the second core, prior to the introduction of the input pulse, a reset pulse is applied from a fourth winding so that if the input pulse produces a magnetomotive force opposite to the one produced by the prior reset pulse, the second core is in the original state of saturation, and the application of the advanced pulse at this point will not produce a signal at its output winding.

When, on the other hand, no input pulse is applied, then at the introduction of an advance pulse no output signal is obtained from the first core, while, because of the prior introduction of a reset pulse through the reset winding, an output signal will appear at the output winding of the second core where this signal will hereinafter be referred to by *f*'.

These and other objects of the present invention will become apparent in the following description when taken in conjunction with the drawings in which:

Figure 6 is a time graph similar to that of Figure 2 showing the condition of the magnetic cores of the trigger pair of the present invention when no input or set pulse is applied.

Figure 7A is a diagrammatic hysteresis loop for one core of the circuit of Figure 1 for the conditions shown in Figure 6.

Figure 7B is a diagrammatic hysteresis loop for the other core of the circuit of Figure 1 for the conditions shown in Figure 6.

Figure 1:
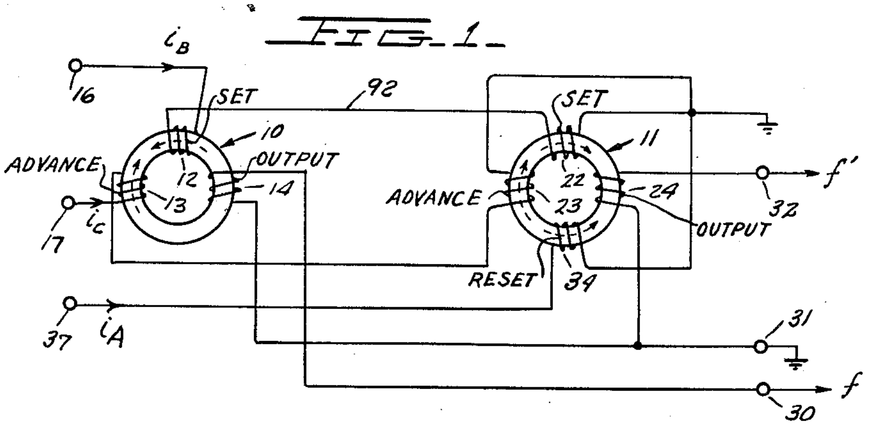
Figure 1 is a schematic diagram of a trigger pair of the present invention using ferro-magnetic elements.

Referring now to Figure 1 showing a trigger pair of the present invention, it will be seen that the trigger pair of the present invention comprises two magnetic cores 10 and 11.

Cores 10 and 11 are made of a substance having a square hysteresis loop. It should be noted, of course, that the present invention is applicable also to cores which do not have a rectangular hysteresis loop as long as appropriate means are provided such as those shown in Patents Nos. 2,666,151 and 2,680,819.

It should be further noted that while the basic concept of the present invention is illustrated mainly through magnetic cores, the same principle can be used in conjunction with ferro-electric substances such as crystals of barium titanate. The only difference resides in the fact that while magnetic cores use windings and currents, ferro-electric storage elements will use plates and voltages.

The use of such ferro-electric elements for storage has been described in a number of articles, for example, the one by J. R. Anderson in Electrical Engineering, vol. 71, pages 916–922, October 1952.

Cores 10 and 11 are shown in Figure 1 as being ring-shaped. Core 10 is provided with windings 12, 13, and 14. Winding 12 will be called, from now on, the set coil, coil 13 the advance coil, and coil 14 the output coil.

It should be noted that for the directions of currents $i_C$ and $i_B$ shown in Figure 1 the coils 12 and 13 are wound so that the magnetic fluxes produced by windings 12 and 13 will oppose each other or, in other words, they will be in opposite directions.

Winding 12 is connected in series to a similar set winding 22 wound around the second core 11. Winding 22, however, is wound to produce a flux in core 11 which is in the opposite direction with respect to the flux produced by winding 12 in core 10. Thus, one end of winding 22 is connected to one end of winding 12. The other end of winding 12 is connected to a terminal indicated schematically at 16. The other end of winding 22 is connected to ground.

Winding 13 is connected on one end to a terminal 17 and on the other end to the first terminal of advance winding 23 of the second core 11. The other end of winding 23 is connected to ground. It should be noted that winding 23 is wound on core 11 in the same direction as that of winding 13 on core 10 so that they produce fluxes in their respective cores having the same direction.

Output winding 14 of core 10 may be provided with a terminal 30 at one end of winding 14, while the other end of winding 14 may be connected to ground through a terminal 31.

Similarly, output winding 24 of the second core 11 is connected at one end to terminal 31 and at the other end to the other output terminal 32. In other words, the trigger pair of the present invention is provided with two output terminals, output terminal 30 of core 10 and output terminal 32 of core 11. As will be seen hereinafter also in connection with Figures 2 and 3, when output terminal 30 has a signal $f$, then output terminal 32 will have its negative $f'$.

Coil 11 is provided with an additional coil 34 which will be referred to from now on as the reset winding. Coil 34 is connected at one end to an input terminal 37 an at the other end to ground.

For the particular input current $i_A$ selected in Figure 1, winding 34 is wound on core 11 to produce a magnetic flux having the direction shown.

Referring now to Figures 1, 2, 3, and 5, it is possible to describe the operation of the trigger pair of the present invention.

Figure 3:
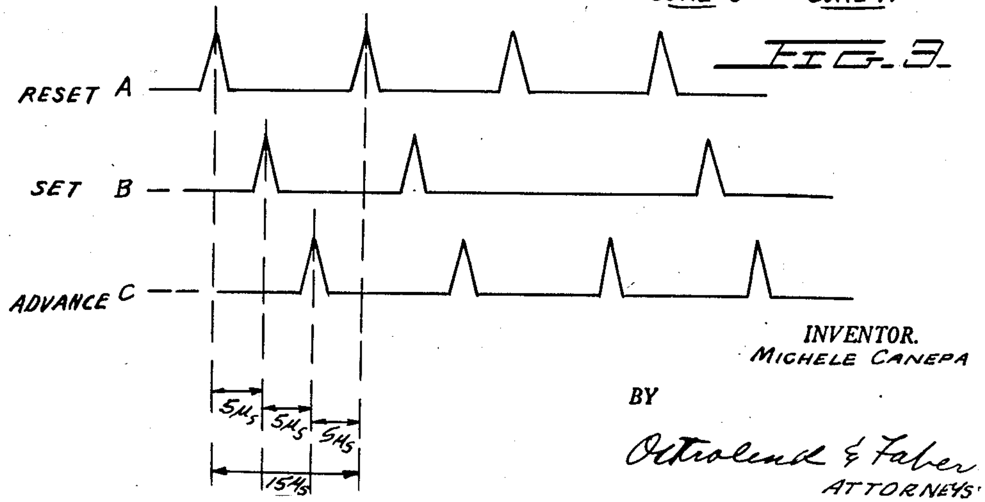
Figure 3 shows the sequence of pulses applied to the windings of the trigger pair of the present invention.

In Figure 3 there are shown pulses A, B, and C where pulses A are the reset pulses, pulses B the set pulses, and pulses C the advance pulses. In a specific example of the present invention, separation between A pulses is of 15 microseconds; the separation between B pulses is also of 15 microseconds, and so is the separation of the C pulses. A, B and C pulses are delayed by 5 microseconds each with respect to the previous one as clearly shown in Figure 3.

Figures 2, 5A, 5B:
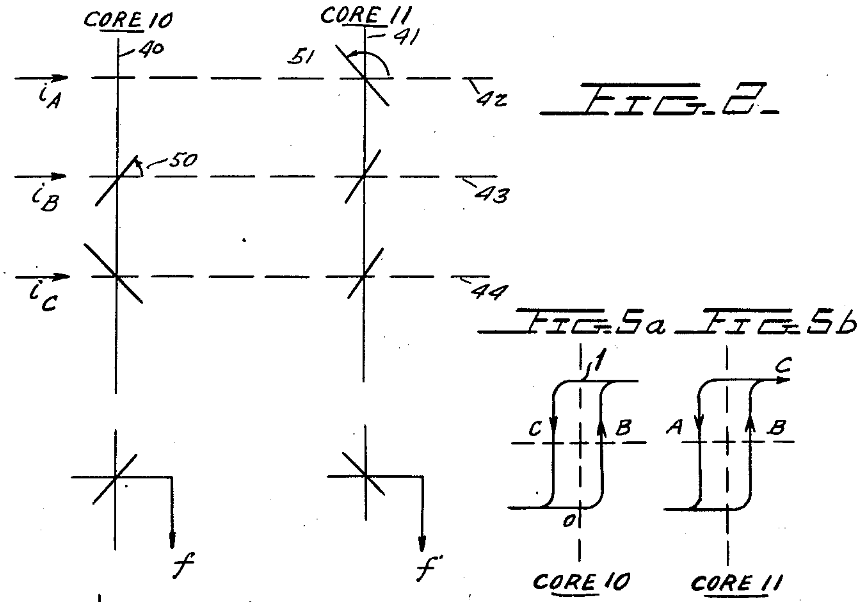
Figure 2 is a time graph for describing the operation of the trigger pair of the present invention when an input or set pulse is applied.
Figure 5A is a diagrammatic hysteresis loop for one core of the circuit of Figure 1 for the conditions shown in Figure 2.
Figure 5B is a diagrammatic hysteresis loop for the other core of the circuit of Figure 1 for the conditions shown in Figure 2.

In Figure 2 there is shown a schematic diagram of the windings of each core with the sequence of the operations which will aid and clarify the description of the operation of the trigger pair.

In Figure 2 vertical line 40 represents the first core 10, while vertical line 41 represents the second core 11. The horizontal lines 42, 43 and 44 represent different times, the interval of time between consecutive horizontal lines being of 5 microseconds, that is, the separation between successive pulses A, B, and C.

Also shown in Figure 2 are the outputs $f$ and $f'$ obtainable from the output windings 14 and 24 of cores 10 and 11, respectively.

The slanted lines at the intersection of the horizontal and vertical lines represent the direction of the magnetic flux in the cores 10 or 11 with the convention that the direction of magnetic flux is derived as the specular reflection of the currents, and more particular it will here be assumed, for simplicity, that a line such as 50, namely, one that forms an angle with the horizontal line 43 in the direction shown of less than 90°, corresponds to a magnetic flux in the specular direction in the core 10, while a line such as 51, which makes an angle with horizontal line 42 of more than 90°, represents a magnetic flux in the assumed negative direction.

It will also be assumed that the magnetomotive forces applied to cores 10 and 11 are sufficient to bring the cores from saturation of one polarity to saturation of the opposite polarity when the magnetomotive forces applied are of the proper direction.

Referring first to core 10, that is, to the vertical line 40 (Figure 2), it will be assumed that a pulse is applied to terminal 16 of Figure 1 to produce a current $i_B$. This current $i_B$ produces a flux in core 10 having the direction shown in Figure 1. The corresponding magnetomotive force will drive core 10 to saturation of the opposite polarity from which it originally started.

If now, after 5 microseconds, a pulse C is applied to the advance winding 13 of core 10, a current $i_C$ is produced which causes a flux in core 10 sufficient to bring core 10 back to saturation of the original polarity. At this time, a pulse $f$ will appear by induction at the output terminal 30 of output coil 14. It is easily seen that at the same time that pulse B was applied to winding 12 of core 10 it was also applied to winding 22 of core 11. It should be noted, however, that at a prior time, through the application of a reset pulse A to reset winding 34 of second core 11, a magnetic flux of the direction shown in Figure 2 had been produced which is opposite to the one produced by the set winding 22.

Therefore, when the advance pulse C is applied to core 11 through winding 23, no output, or at least only a very small output pulse, will appear across the output coil 24 of the second core 11.

To summarize the above, and referring to Figures 5A and 5B, it will be seen from Figure 5A, which shows the idealized hysteresis loop for core 10, that core 10 is initially at saturation of negative polarity indicated by the 0 in Figure 5A. When the set magnetomotive force is applied to core 10 through winding 12, core 10 goes to saturation of the opposite polarity as shown in point 1 of Figure 5A. When finally the advance magnetomotive force C is applied to core 10 through winding 13, core 10 returns to its original saturation.

Referring to Figure 5B which shows the idealized hysteresis loop for core 11, core 11 is originally at the saturation of the polarity shown in Figure 5B. Before the application of the set pulse B, a reset pulse A is applied to core 11 through winding 34 to bring core 11 to saturation in the opposite direction indicated by the 0 of Figure 5B. When the set pulse B is applied through winding 22, core 11 goes back to saturation of the original polarity as indicated by the letter B.

If now an advance pulse C is applied through coil 23, since it produces a magnetomotive force in the same direction as that produced by pulse B, core 11 will remain in saturation of the same polarity and, therefore, no output pulse will appear across output winding 24 of core 11, while at the same time an output pulse has appeared across output winding 14 of the first core 10.

When no set pulse B is applied to cores 10 and 11 as shown for the third position from the left of the B pulses in Figure 3, the opposite action will take place, namely, there will be no output across winding 14 of the first core 10 while there will be an output across winding 24 of core 11.

More particularly, referring to Figures 6, 7A and 7B it will be seen that when no set pulse B is applied, the operation will delay the schematic of Figures 6, 7A and 7B. In fact, referring first to core 10 represented by the vertical line 40 of Figure 6, it will be seen that since $i_B$ is equal to 0 on the application of the shift or advance pulse C, there will be no output across the winding 14 of the first core 10. This corresponds to the condition shown in Figure 7A where the magnetic core 10 is originally in position 0 and since there is no B pulse at this time, the application of a C pulse in the direction shown will cause no output voltage since it will not change the polarity of the saturation.

Referring now to Figure 7B and also at the same time to vertical line 41 of the second core 11, it will be noticed that when a reset pulse A is applied as shown in Figures 6 and 7B, the core will go from the saturation of one polarity to saturation of the opposite polarity. See the arrow accompanying the letter A.

In this case, however, since there is no set pulse B when an advance pulse C is applied, core 11 is brought back to its original polarization, thus causing a pulse which we may call $f'$ across the winding 24 of core 11.

In other words, when there is no input pulse, that is no set or B pulse, the trigger pair of the present invention will produce an indication of the absence of such a pulse in the form of an output pulse $f'$ appearing across winding 24 of core 11.

When, on the other hand, there is an input or set pulse B, the opposite will take place, namely, an output will appear across winding 14 of core 10 to give the indication $f$, that is, that a set pulse B was present at a given time.

As seen above, the trigger pair of the present invention shown in Figure 1 can produce an indication of a binary quantity $f$ and its complement $f'$.

Figure 4:
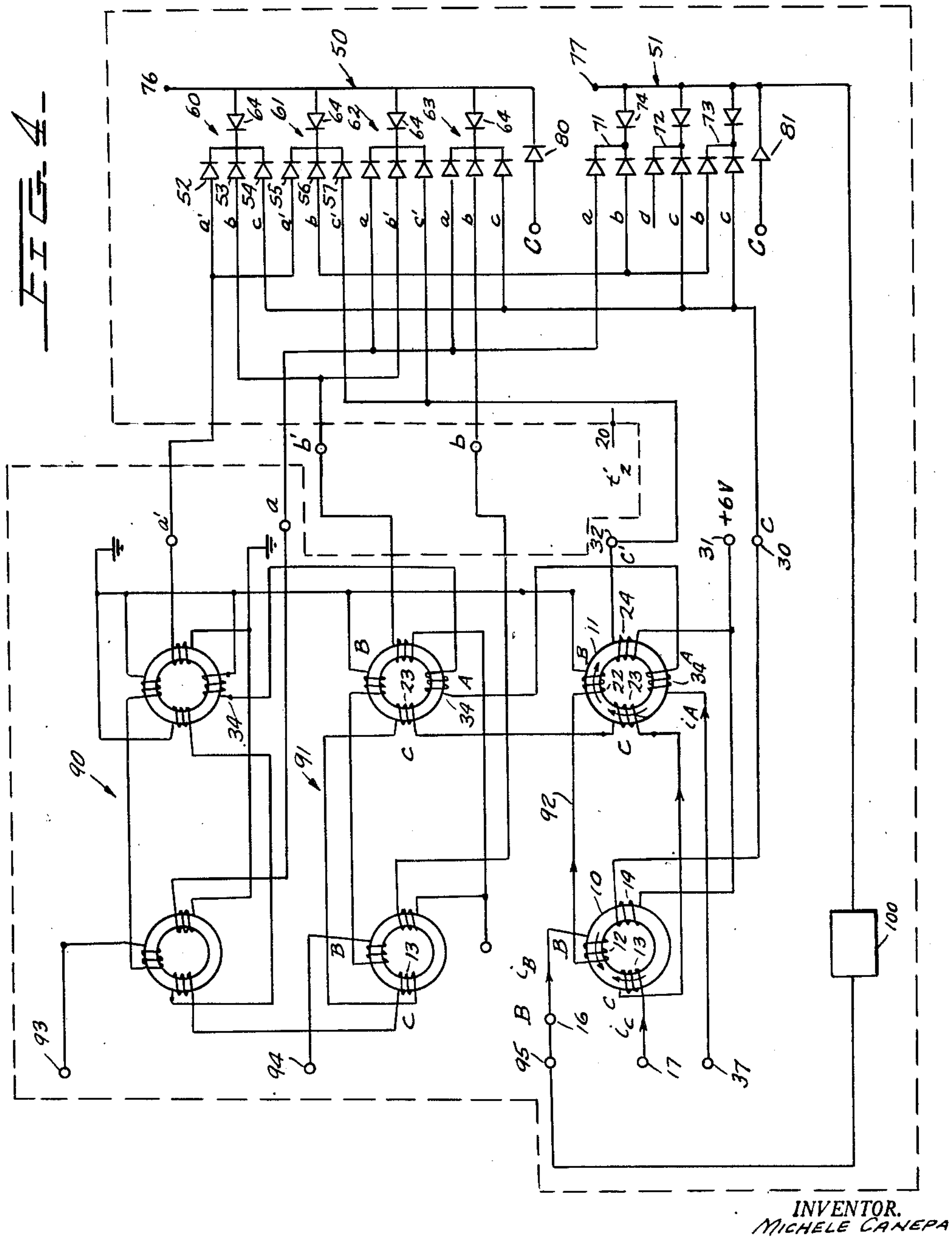
Figure 4 is a circuit diagram showing the application of the trigger pairs of the present invention to a binary adder.

Figure 4 shows an application of the trigger pair of the present invention to an adding circuit in which the binary adder consists of a network of rectifiers which may be of the germanium type.

Referring to Figure 4, the binary adder consists of two sections: section 50 which may be called the sum section and section 51 which may be called the carry section. The design of sections 50 and 51 is well known in the art and can be obtained by simply combining three input signals, the binary numbers $a$, $b$, and $c$, where $c$ may be the carry from a previous adding operation.

In addition to the three binary numbers $a$, $b$, and $c$, such binary adders also require the binary numbers $a'$, $b'$ and $c'$. As indicated in Figure 4, in the case of a binary adder, the result may consist of a two digit binary number, one of which, namely the one of lower value, will be called here Sum while the other will be called Carry.

For example, if $a=1$, $b=1$, and $c=0$, then $S=0$ and $C=1$. Or, also, when $a=1$, $b=1$ and $c=1$, S will be equal to 1, and $C=1$. The rectifier network 50 will produce at its output the binary digit S, while the rectifier network 51 will produce the binary digit C.

As previously mentioned, from the table of combination of the three numbers $a$, $b$, and $c$, one can obtain the following expression for S in terms of $a$, $b$, $c$:

$$S=a'b'c+a'bc'+ab'c'+abc$$

Similarly, the expression for C will be:

$$C=ab+ac+bc$$

The above expressions use well known notations of Boolean algebra.

It will be noted that in network 50 one rectifier is assigned to each binary term; for example, considering $a'b'c$ it will be seen that $a'$ is applied to rectifier 52, $b'$ is applied to rectifier 53, and $c$ is applied to rectifier 54. Rectifiers 52, 53 and 54 are connected together at their cathodes to form what is known as a gate or And circuit. Similarly, the product $a'bc'$ corresponds to the And circuit having rectifiers 55, 56 and 57. For simplicity, the And circuit $a'b'c$ will be referred to from now on as the And circuit 60; And circuit $a'bc'$ will be referred to by numeral 61; And circuit $ab'c'$ will be referred to by numeral 62, and And circuit $abc$ will be referred to by numeral 63. And circuits 60, 61, 62 and 63 are each connected to another rectifier 64 which forms an Or circuit.

Rectifiers 64 have their plates connected together, thereby completing the binary adding circuit S, in other words, realizing the above mentioned function S. Rectifier circuit 51 which realizes the function C comprises three And circuits, 71 for ($ab$), 72 for ($ac$), and 73 for ($bc$), with rectifiers 74 having their plates connected together to form the Or connectives, thereby completing the function C.

From the above it is now easily seen that whenever the sum of the binary quantities $a$, $b$ and $c$ is such that S is equal to 1, then an output signal will appear at the terminal 76 of the sum section of the present binary adder, and whenever the sum of $ab$ and $c$ gives $C=1$, an output pulse will appear at the terminal 77 of the section C.

It will be seen in Figure 4 that in addition to the above described rectifying elements both sections 50 and 51 are provided with additional rectifiers 80 and 81, respectively, which serve for gating the two sections 50 and 51 by a pulse C subsequent to pulses A and B (see Figure 3) so that the rectifier sections 50 and 51 are operative only, and only if a signal of the proper polarity is applied to the inputs indicated in Figure 4 by the letter C.

It will also be seen that to provide the inputs $abc$ and $a'b'c'$, three trigger pairs 90, 91 and 92 of the type shown in Figure 1 have been used.

Furthermore, each trigger pair 90, 91 and 92 is provided with a B input to which are applied the B or set pulses. The B input terminals are denoted by numerals 93, 94 and 95, respectively, for the three trigger pairs 90, 91 and 92. To terminal 17 is applied the advance or shift pulse C.

Shift windings 13 and 23 which as previously mentioned were connected in series in each trigger pair are also connected in series from one trigger pair to the next. Similarly, all the reset windings 34 of the three trigger pairs 90, 91 and 92 are connected in series.

Each trigger pair 90, 91 and 92 will, of course, have independent output terminals which are denoted here by the letters *a,a'* for trigger pair 90, *b,b'* for trigger pair 91, *c,c'* for trigger pair 92. This designation of the output terminals is only by way of example to show how the inputs to the rectifier circuits 50 and 51 can be obtained by the novel trigger pair of the present invention.

It was previously mentioned that trigger pair 92 produces in this particular embodiment the binary digits *c* and *c'* which as described in connection with rectifier circuits 50 and 51 are the carry signals from previous operations. These carry signals are applied to the input terminal 95 of trigger pair 92 through a delayed network indicated here schematically by block 100. This carry signal is introduced at terminal 95 at the same time that the *a* and *b* signals are introduced at terminals 93 and 94 of trigger pairs 90 and 91, respectively.

It will be noted from the above description that the adding circuit of the present invention is considerably simpler than the ones in use at the present time since here each trigger pair uses essentially only two magnetic cores without an additional vacuum tube operating as an inverter. Therefore, one vacuum tube is saved for each trigger pair with a total saving of three vacuum tubes for the set of three trigger pairs 90, 91 and 92.

In the above description, a specific embodiment of the present invention has been shown. Other modifications may be made by those skilled in the art without departing from the spirit and scope of the invention itself.

What I claim as new and desire to secure by Letters Patent is:

1. A binary system comprising a pair of elements having rectangular hysteresis loops, input means, advance means and output means on each of said elements, said input means of one of said elements being connected in series with an input means of the second of said elements, said advance means of said first element being connected in series with the advance means of said second element, said advance means causing saturation of the first of said elements in the direction opposite to that produced by said input means, said output means providing an indication of the polarity of the saturation of said elements at energization of said advance means, said second element having an additonal means, said input and advance means of said second element both producing saturation in the same direction, said last mentioned means producing saturation in the opposite direction.

2. A binary system capable of providing indications of the presence of a signal or of its binary complement comprising a pair of elements having a hysteresis loop, means for causing saturation of one of said elements in one direction, said means causing saturation of said second element in the opposite direction, a second means for causing saturation of the said two elements in the same direction, a third means energized prior to said first and second means for causing saturation of said second element in the direction opposite to that caused by said first and second means on said second element.

3. A binary system for producing an indication of the presence of a signal or of its binary complement comprising a pair of ferromagnetic cores having an approximately rectangular hysteresis loop, a set winding wound on each of said cores, said set windings being connected in series, an advance winding also on each of said cores, said advance windings being connected in series, an output winding on each of said cores from which the desired signals may be obtained, said set and advance windings of said first core producing magnetomotive forces of opposite sign, said set and advance windings of said second core producing magnetomotive forces of the same sign, a reset winding wound on said second core for producing a magnetomotive force of sign opposite to that of said set and advance windings of said second core.

4. A binary system for producing an indication of the presence of a signal or of its binary complement comprising a pair of ferromagnetic cores having an approximately rectangular hysteresis loop, a set winding wound on each of said cores, said set windings being connected in series, an advance winding also on each of said cores, said advance windings being connected in series, an output winding on each of said cores from which the desired signals may be obtained, said set and advance windings of said first core producing magnetomotive forces of opposite sign, said set and advance windings of said second core producing magnetomotive forces of the same sign, a reset winding wound on said second core for producing a magnetomotive force of sign opposite to that of said set and advance windings of said second core, means for providing a sequence of pulses for said set, advance and reset windings.

5. A binary system for producing an indication of the presence of a signal or of its binary complement comprising a pair of ferromagnetic cores having an approximately rectangular hysteresis loop, a set winding wound on each of said cores, said set windings being connected in series, an advance winding also on each of said cores, said advance windings being connected in series, an output winding on each of said cores from which the desired signals may be obtained, said set and advance windings of said first core producing magnetomotive forces of opposite sign, said set and advance windings of said second core producing magnetomotive forces of the same sign, a reset winding wound on said second core for producing a magnetomotive force of sign opposite to that of said set and advance windings of said second core, means for providing sequential pulses for said set, advance and reset windings having a magnitude sufficient to produce magnetomotive forces capable of saturating the said cores in the desired directions.

6. A binary system for producing an indication of the presence of a signal or of its binary complement comprising a pair of ferromagnetic cores having an approximately rectangular hysteresis loop, a set winding wound on each of said cores, said set windings being connected in series, an advance winding also on each of said cores, said advance windings being connected in series, an output winding on each of said cores from which the desired signals may be obtained, said set and advance windings of said first core being wound in the opposite direction to produce, when energized by pulses of the same polarity, magnetomotive forces of opposite sign in said core, said set and advance windings of said second core being wound in the same direction so that when energized by pulses of the same polarity, magnetomotive forces of the same sign are produced in said second core, the reset winding being wound on said second core in the direction opposite to that of said set and advance winding of said second core for producing, at application of pulses of the same polarity as those for the said set and advance windings, a magnetomotive force of sign opposite to that of said set and advance windings of said second core.

References Cited in the file of this patent

UNITED STATES PATENTS 2,640,164 Giel et al. ............. May 26, 1953